US011345810B2

United States Patent
Liao et al.

(10) Patent No.: US 11,345,810 B2
(45) Date of Patent: May 31, 2022

(54) PBT COMPOSITE MATERIAL HAVING HIGH HEAT RESISTANCE AND HIGH GLOSS FOR VEHICLE MIRROR AND METHOD FOR PREPARING THE SAME

(71) Applicant: NAN YA PLASTICS CORPORATION, Taipei (TW)

(72) Inventors: Te-Chao Liao, Taipei (TW); Han-Ching Hsu, Taipei (TW); Kai-Chih Lei, Taipei (TW); Chun-Lai Chen, Taipei (TW)

(73) Assignee: NAN YA PLASTICS CORPORATION, Taipei (TW)

( * ) Notice: Subject to any disclaimer, the term of this patent is extended or adjusted under 35 U.S.C. 154(b) by 224 days.

(21) Appl. No.: 16/726,620

(22) Filed: Dec. 24, 2019

(65) Prior Publication Data
US 2020/0199353 A1 Jun. 25, 2020

(30) Foreign Application Priority Data

Dec. 25, 2018 (TW) ................................. 107147003

(51) Int. Cl.
| | | |
|---|---|---|
| *C08L 67/02* | (2006.01) | |
| *C08J 3/20* | (2006.01) | |
| C08K 13/02 | (2006.01) | |
| C08K 3/014 | (2018.01) | |
| C08K 5/00 | (2006.01) | |
| C08K 3/013 | (2018.01) | |

(52) U.S. Cl.
CPC .............. *C08L 67/02* (2013.01); *C08J 3/203* (2013.01); *C08J 2367/02* (2013.01); *C08J 2467/02* (2013.01); *C08K 3/013* (2018.01); *C08K 3/014* (2018.01); *C08K 5/005* (2013.01); *C08K 5/0083* (2013.01); *C08K 13/02* (2013.01); *C08L 2201/08* (2013.01); *C08L 2205/025* (2013.01)

(58) Field of Classification Search
CPC .............. C08L 67/02; C08L 2201/08; C08L 2205/025; C08J 2367/02; C08J 2467/02; C08J 3/203; C08K 3/013; C08K 3/014; C08K 3/34; C08K 5/005; C08K 5/0083; C08K 13/02

See application file for complete search history.

(56) References Cited

U.S. PATENT DOCUMENTS

| | | | | | |
|---|---|---|---|---|---|
| 4,203,887 | A | * | 5/1980 | Goedde | C08K 3/34 524/262 |
| 5,326,806 | A | * | 7/1994 | Yokoshima | C08K 3/2279 524/114 |

FOREIGN PATENT DOCUMENTS

| | | | |
|---|---|---|---|
| CN | 101481494 A | 7/2009 | |
| CN | 102040808 B | 8/2012 | |
| CN | 105295314 A | 2/2016 | |
| CN | 103804859 B | 4/2016 | |
| WO | WO 02092688 A1 * | 11/2002 | ............... C08L 67/02 |

OTHER PUBLICATIONS

Derwent abstract of CN 102719060 A, to Sun et al. published Oct. 10, 2012 (Year: 2012).*
EPO machine translation of CN 102719060 B, to Sun et al. published Oct. 10, 2012 (Year: 2012).*
EPO machine translation of WO 02092688 A1 to Fujie et al., published Nov. 2002 (Year: 2002).*
EPO machine translation of CN 102492276 A, to Dong et al., published Jun. 13, 2012 (Year: 2012).*

* cited by examiner

*Primary Examiner* — Jane L Stanley
(74) *Attorney, Agent, or Firm* — Li & Cai Intellectual Property (USA) Office

(57) ABSTRACT

A PBT composite material having high heat resistance and high gloss for a vehicle mirror and a method for preparing the same are provided. The PBT composite material includes 57.2-88.9 wt % of PBT, 5-20 wt % of PET, 5-20 wt % of calcium silicate, 0-10 wt % of coupling agent-modified talc, 0.1-0.3 wt % of an antioxidant, 0.5-1.5 wt % of a flowing aid and 0.5-1.0 wt % of a nucleating agent. In the preparing method, the above components are placed into an extruding machine to perform a melt plasticization, and a molten material extruded by a die head of the extruding machine is water-cooled and stretched into a stripe to be granulated. The resulting PBT composite material has an excellent heat resistance and a good surface gloss and is suitable for manufacturing a high heat-resistant and high gloss vehicle mirror.

14 Claims, No Drawings

PBT COMPOSITE MATERIAL HAVING HIGH HEAT RESISTANCE AND HIGH GLOSS FOR VEHICLE MIRROR AND METHOD FOR PREPARING THE SAME

CROSS-REFERENCE TO RELATED PATENT APPLICATION

This application claims the benefit of priority to Taiwan Patent Application No. 107147003 filed on Dec. 25, 2018. The entire content of the above identified application is incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to a PBT composite material having high heat resistance and high gloss, and more particularly to a PBT composite material suitable for manufacturing a high heat-resistant and high gloss vehicle mirror.

BACKGROUND OF THE DISCLOSURE

A car lamp generally includes a holder, one or more light-emitting elements, a reflecting mirror, a decorative ring and a light-distributing lens. Examples of the car lamp include illumination lamps (e.g., headlamp, fog lamp and reversing lamp) and signal lamps (e.g., turn signal lamp, warning lamp and tail lamp). In use, different car lamps need different heat resistances and may require different materials. In order to meet the requirements of the maximum lighting power of the headlamp and the fog lamp, the two lamps require high heat-resistant materials. The reflecting mirror is a component that bears the highest temperature out of all plastic components in the car lamp, and thus it must have good heat resistance and surface gloss.

A deformation of a lamp body may occur at high temperatures and thus affect the safe use of the car lamp. In order to prevent the car lamp from having a temperature exceeding 120° C. in a short period of time due to its frequent use, the lamp body was mainly made of a PC or PC/ABS material. In recent years, with the increase of operation temperatures of different types of cars, PPS and PEI resins, which have high heat resistance but are expensive, are used in place of the conventional material for manufacturing the car lamp. However, in consideration of costs, PBT composite materials have been developed to replace PPS and PEI resins.

SUMMARY OF THE DISCLOSURE

In response to the above-referenced technical inadequacies, the present disclosure provides a PBT composite material suitable for manufacturing a high heat-resistant and high gloss vehicle mirror. The PBT composite material, based on the total weight of the PBT composite material, includes the following components, the total amount of which is 100 wt %:

(1) 57.2-88.9 wt % of PBT;
(2) 5-20 wt % of PET;
(3) 5-20 wt % of calcium silicate;
(4) 0-10 wt % of coupling agent-modified talc;
(5) 0.1-0.3 wt % of an antioxidant;
(6) 0.5-1.5 wt % of a flowing aid; and
(7) 0.5-1.0 wt % of a nucleating agent.

The PBT composite material of the present disclosure not only has advantages of PBT including good processability, low-temperature resistance, weather resistance and chemical resistance, but also improves the properties of PET including crystallinity and molding processability. The PBT composite material notably has an excellent heat resistance and surface gloss.

In one aspect, the present disclosure provides a method for preparing the PBT composite material having high heat resistance and high gloss, including: step (1), providing a weight ratio of PBT, PET, the antioxidant, the flowing aid and the nucleating agent in predetermined amounts; step (2), mixing PBT, PET, the antioxidant, the flowing aid and the nucleating agent at a predetermined weight ratio and mixing for 10-20 minutes by a high speed mixing machine to obtain one mixed material and placing the one mixed material into a main feed hopper of a twin-screw extruding machine; step (3), mixing calcium silicate and coupling agent-modified talc at a predetermined weight ratio and mixing for 5-10 minutes by a mixing machine to obtain another mixed material and placing the another mixed material into a side feed hopper of the twin-screw extruding machine; and step (4), performing melting, extruding and granulating processes by the twin-screw extruding machine to obtain the PBT composite material, wherein the twin-screw extruding machine has a first heating section at a temperature of 210-230° C., a second heating section at a temperature of 230-250° C., a third heating section at a temperature of 230-265° C., a fourth heating section at a temperature of 230-260° C. and a fifth heating section at a temperature of 230-265° C., and has a screw rotation speed of 200-350 rpm.

The PBT composite material of the present disclosure has the following advantages:
1. the PBT composite material has an excellent heat resistance and a good surface gloss;
2. the PBT composite material can be used for a metal-evaporating treatment without a base paint, so that processing costs can be further reduced.
3. the PBT composite material has an improved flowability so that it can be used for manufacturing a thinner mirror and result in a reduced processing time.

These and other aspects of the present disclosure will become apparent from the following description of the embodiment taken in conjunction with the following drawings and their captions, although variations and modifications therein may be affected without departing from the spirit and scope of the novel concepts of the disclosure.

DETAILED DESCRIPTION OF THE EXEMPLARY EMBODIMENTS

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a", "an", and "the" includes plural reference, and the meaning of "in" includes "in" and "on". Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first", "second" or "third" can be used to describe various components, signals or the like, which are for distinguishing one component/signal from another one only, and are not intended to, nor should be construed to impose any substantive limitations on the components, signals or the like.

A PBT composite material of the present disclosure is suitable for manufacturing a high heat-resistant and high gloss vehicle mirror. The PBT composite material, based on the total weight of the PBT composite material, includes the following components, the total amount of which is 100 wt %:
(1) 57.2-88.9 wt % of PBT;
(2) 5-20 wt % of PET;
(3) 5-20 wt % of calcium silicate;
(4) 0-10 wt % of coupling agent-modified talc;
(5) 0.1-0.3 wt % of an antioxidant;
(6) 0.5-1.5 wt % of a flowing aid; and
(7) 0.5-1.0 wt % of a nucleating agent.

PBT serving as a major component provides good performances in terms of mechanical strength and flowability. PET serving as an auxiliary component is added to improve the heat resistance of the composite material. Calcium silicate and coupling agent-modified talc serving as inorganic fillers are added to increase mechanical properties, heat resistance, warpage resistance and surface gloss of the composite material. The antioxidant is added to prevent the composite material from being oxidized during processing. The flowing aid is added to reduce friction between materials and increase the surface gloss of the resulting product. The nucleating agent is added to improve and increase the crystallization effect and crystallization speed of PET and increase the heat resistance of the composite material.

In the following examples, said PBT preferably has a relative density of 1.30-1.35 g/cm$^3$, a melting point of 220-230° C. and an intrinsic viscosity (IV) of 0.85-1.2 dL/g. Said PBT may be purchased from Changchun Company of Taiwan or Mitsubishi Company of Japan.

Said PET preferably has a relative density of 1.35-1.40 g/cm$^3$, a melting point of 250-260° C. and an intrinsic viscosity (IV) of 0.65-0.85 dL/g. Said PET may be purchased from Nanya or Lealea Company of Taiwan.

Said calcium silicate and said coupling agent-modified talc are mixed at a weight ratio from 1:0.25 to 1:1.5. Said calcium silicate has an average particle size of 3-8 μm, and said coupling agent-modified talc has an average particle size of 1-4 μm.

Said coupling agent-modified talc is prepared by mixing 98.5 wt % of talc and 1.5 wt % of a silane or titanate coupling agent at a high speed for 10-60 minutes.

The antioxidant is at least one selected from pentaerythritol tetrakis(3-(3,5-di-tert-butyl-4-hydroxyphenyl)propionate), tris(2,4-di-tert-butylphenyl)phosphite and octadecyl 3-(3,5-di-tert-butyl-4-hydroxyphenyl)propionate. Examples of the commercially available antioxidant include Irganox® 1010, Irganox® 168, Irganox® 1076 and PW-9225.

The flowing aid is at least one selected from dimethylsiloxane, a polyester copolymer and a phthalic acid-based polyester. Examples of the commercially available flowing aid include TEGOMER® H-Si 6441 P and DIC A55.

The nucleating agent is at least one selected from a long-chain linear saturated sodium carboxylate, a long-chain linear saturated calcium carboxylate and an aromatic sodium or magnesium carboxylate.

Example 1

The PBT composite material of Example 1, which has high heat resistance and high gloss and is applied to the vehicle mirror, includes 89 wt % of PBT, 5 wt % of PET, 5 wt % of calcium silicate, 0.3 wt % of an antioxidant, 0.5 wt % of a flowing aid and 0.2 wt % of a nucleating agent. The PBT composite material of Example 1 is prepared by the steps as follows:

Firstly, PBT, PET, the antioxidant, the flowing aid and the nucleating agent were provided in predetermined amounts by weighing and mixed at a predetermined weight ratio, and mixed for 10 minutes by a high speed mixing machine, so as to obtain a mixed material. Next, the mixed material was placed into a main feed hopper of a twin-screw extruding machine, and calcium silicate was placed into a side feed hopper of the twin-screw extruding machine. Finally, a molten material was extruded by the twin-screw extruding machine to be granulated. The twin-screw extruding machine has a twin-screw provided with five heating sections, i.e., a first heating section at a temperature of 210° C., a second heating section at a temperature of 240° C., a third heating section at a temperature of 250° C., a fourth heating section at a temperature of 250° C. and a fifth heating section at a temperature of 255° C., and a rotation speed of the twin-screw is 200 rpm.

Example 2

The PBT composite material of Example 2, which has high heat resistance and high gloss and is applied to the vehicle mirror, includes 78.8 wt % of PBT, 10 wt % of PET, 10 wt % of calcium silicate, 0.3 wt % of an antioxidant, 0.5 wt % of a flowing aid and 0.4 wt % of a nucleating agent. The PBT composite material of Example 2 is prepared by the steps as follows:

Firstly, PBT, PET, the antioxidant, the flowing aid and the nucleating agent were provided in predetermined amounts by weighing and mixed at a predetermined weight ratio, and mixed for 12 minutes by a high speed mixing machine, so as to obtain a mixed material. Next, the mixed material was placed into a main feed hopper of a twin-screw extruding machine, and calcium silicate was placed into a side feed hopper of the twin-screw extruding machine. Finally, a molten material was extruded by the twin-screw extruding machine to be granulated. The twin-screw extruding machine has a twin-screw provided with five heating sections, i.e., a first heating section at a temperature of 220° C., a second heating section at a temperature of 245° C., a third heating section at a temperature of 250° C., a fourth heating section at a temperature of 255° C. and a fifth heating section at a temperature of 260° C., and a rotation speed of the twin-screw is 250 rpm.

Example 3

The PBT composite material of Example 3, which has high heat resistance and high gloss and is applied to the vehicle mirror, includes 63.1 wt % of PBT, 15 wt % of PET, 20 wt % of calcium silicate, 0.3 wt % of an antioxidant, 1 wt % of a flowing aid and 0.6 wt % of a nucleating agent. The PBT composite material of Example 3 is prepared by the steps as follows:

Firstly, PBT, PET, the antioxidant, the flowing aid and the nucleating agent were provided in predetermined amounts by weighing and mixed at a predetermined weight ratio and mixing for 15 minutes by a high speed mixing machine, so as to obtain a mixed material. Next, the mixed material was placed into a main feed hopper of a twin-screw extruding machine, and calcium silicate was placed into a side feed hopper of the twin-screw extruding machine. Finally, a molten material was extruded by the twin-screw extruding machine to be granulated. The twin-screw extruding machine has a twin-screw provided with five heating sections, i.e., a first heating section at a temperature of 230, a second heating section at a temperature of 250° C., a third heating section at a temperature of 255° C., a fourth heating section at a temperature of 255° C. and a fifth heating section at a temperature of 260° C., and the rotation speed of the twin-screw is 300 rpm.

Example 4

The PBT composite material of Example 4, which has high heat resistance and high gloss and is applied to the vehicle mirror, includes 62.9 wt % of PBT, 15 wt % of PET, 10 wt % of calcium silicate, 10 wt % of coupling agent-modified talc, 0.3 wt % of an antioxidant, 1 wt % of a flowing aid and 0.8 wt % of a nucleating agent. The PBT composite material of Example 4 is prepared by the steps as follows:

Firstly, PBT, PET, the antioxidant, the flowing aid and the nucleating agent were provided in predetermined amounts by weighing and mixed at a predetermined weight ratio and mixing for 12 minutes by a high speed mixing machine, so as to obtain one mixed material. Next, the one mixed material was placed into a main feed hopper of a twin-screw extruding machine. Next, calcium silicate and coupling agent-modified talc were mixed at another predetermined weight ratio for 8 minutes by a mixing machine to obtain another mixed material, and the another mixed material was placed into a side feed hopper of the twin-screw extruding machine. Finally, a molten material was extruded by the twin-screw extruding machine to be granulated. The twin-screw extruding machine has a twin-screw provided with five heating sections, i.e., a first heating section at a temperature of 230, a second heating section at a temperature of 250° C., a third heating section at a temperature of 245° C., a fourth heating section at a temperature of 245° C. and a fifth heating section at a temperature of 260° C., and the rotation speed of the twin-screw is 350 rpm.

Example 5

The PBT composite material of Example 5, which has high heat resistance and high gloss and is applied to the vehicle mirror, includes 57.2 wt % of PBT, 20 wt % of PET, 15 wt % of calcium silicate, 5 wt % of coupling agent-modified talc, 0.3 wt % of an antioxidant, 1.5 wt % of a flowing aid and 1.0 wt % of a nucleating agent. The PBT composite material of Example 5 is prepared by the steps as follows:

Firstly, PBT, PET, the antioxidant, the flowing aid and the nucleating agent were provided in predetermined amounts by weighing and mixed at a predetermined weight ratio and mixing for 12 minutes by a high speed mixing machine, so as to obtain one mixed material. Next, the one mixed material was placed into a main feed hopper of a twin-screw extruding machine. Next, calcium silicate and coupling agent-modified talc were mixed at another predetermined weight ratio for 5 minutes by a mixing machine to obtain another mixed material, and the another mixed material was placed into a side feed hopper of the twin-screw extruding machine. Finally, a molten material was extruded by the twin-screw extruding machine to be granulated. The twin-screw extruding machine has a twin-screw provided with five heating sections, i.e., a first heating section at a temperature of 230, a second heating section at a temperature of 250° C., a third heating section at a temperature of 245° C., a fourth heating section at a temperature of 250° C. and a fifth heating section at a temperature of 260° C., and the rotation speed of the twin-screw is 350 rpm.

Comparative Example 1

The PBT composite material of Comparative Example 1, which has high heat resistance and high gloss and is applied to the vehicle mirror, includes 58.1 wt % of PBT, 15 wt % of PET, 5 wt % of PC, 20 wt % of calcium silicate, 0.3 wt % of an antioxidant, 1.0 wt % of a flowing aid and 0.6 wt % of a nucleating agent. The PBT composite material of Comparative Example 1 is prepared by the steps as follows:

Firstly, PBT, PET, PC, the antioxidant, the flowing aid and the nucleating agent were provided in predetermined amounts by weighing and mixed at a predetermined weight ratio and mixing for 15 minutes by a high speed mixing machine, so as to obtain a mixed material. Next, the mixed material was placed into a main feed hopper of a twin-screw extruding machine, and calcium silicate was placed into a side feed hopper of the twin-screw extruding machine. Finally, a molten material was extruded by the twin-screw extruding machine to be granulated. The twin-screw extruding machine has a twin-screw provided with five heating sections, i.e., a first heating section at a temperature of 230° C., a second heating section at a temperature of 255° C., a third heating section at a temperature of 260° C., a fourth heating section at a temperature of 260° C. and a fifth heating section at a temperature of 265° C., and the rotation speed of the twin-screw is 300 rpm.

Comparative Example 2

The PBT composite material of Comparative Example 2, which has high heat resistance and high gloss and is applied to the vehicle mirror, includes 63.7 wt % of PBT, 15 wt % of PET, 10 wt % of calcium silicate, 10 wt % of glass fibers, 0.3 wt % of an antioxidant, 1.0 wt % of a flowing aid and 0.8 wt % of a nucleating agent. The PBT composite material of Comparative Example 2 is prepared by the steps as follows:

Firstly, PBT, PET, the antioxidant, the flowing aid and the nucleating agent were provided in predetermined amounts by weighing and mixed at a predetermined weight ratio and mixing for 12 minutes by a high speed mixing machine, so as to obtain one mixed material. Next, the one mixed material was placed into a main feed hopper of a twin-screw extruding machine. Next, calcium silicate and the glass fibers were mixed at another predetermined weight ratio for 5 minutes by a mixing machine to obtain another mixed material, and the another mixed material was placed into a side feed hopper of the twin-screw extruding machine. Finally, a molten material was extruded by the twin-screw extruding machine to be granulated. The twin-screw extruding machine has a twin-screw provided with five heating sections, i.e., a first heating section at a temperature of 230, a second heating section at a temperature of 250° C., a third heating section at a temperature of 245° C., a fourth heating section at a temperature of 245° C. and a fifth heating section at a temperature of 260° C., and the rotation speed of the twin-screw is 350 rpm.

Properties Tests and Evaluation

The PBT composite materials of Examples 1-5 and Comparative Examples 1 and 2 were formed into particle materials. The particle materials were dried at 110-120° C. for 4 hours in a blow-drying device. The dried particle materials were injection-molded into test samples at a molding temperature of 80-100° C. The physical properties of the test samples were tested at room temperature (23° C.) by the following methods.

1. Tensile strength was tested in accordance with ASTM D638 standard at a stretch speed of 50 mm/min. For this test, the sample size was 165±2 mm×19±0.2 mm×3.2±0.2 mm 2. Flexural strength and flexural modulus were tested in accordance with ASTM D790 standard at a bending speed of 13 mm/min. For this test, the sample size was 127±2 mm×12.7±0.2 mm×3.2±0.2 mm.

3. Izod impact strength (Kg-cm/cm) was tested in accordance with ASTM D256 standard. For this test, the sample size was 63.5±2 mm×12.7±0 2 mm×3.2±0.2 mm, the notch angle was 45±1°, the notch radius was 0.25±0.12 mm, and the notch depth was 10.16±0.05 mm.

4. Heat distortion temperature was tested in accordance with ASTM D648 standard at a heating rate of 120° C./hr and a pressure of 1.82 MPa (4.6 kg/cm$^2$). For this test, the sample size used was 127±2 mm×12.7±0.2 mm×3.2±0.2 mm, and a distortion value was 0.254 mm.

5. Surface gloss was tested in accordance with ASTM D2457 standard. For this test, the test angle was 60°, and the sample size was 100 mm×100 mm×2 mm.

The compositions of the PBT composite materials of Examples 1-5 and Comparative Examples 1 and 2 and the outstanding properties therefrom are shown in Table 1, and the comparison and analysis of the PBT composite materials are shown below.

It is observed from the comparison of Comparative Example 1 with Example 3 that although the PBT composite material of Comparative Example 1 increase the surface gloss in the presence of PC, it has an excessive decrease in heat distortion temperature and thus is not suitable for manufacturing a high heat-resistant and high gloss vehicle mirror.

It is observed from the comparison of Comparative Example 2 with Examples 1-5 that, in the presence of glass fibers, molded articles resulting from the PBT composite material of Comparative Example 2 has a lower surface gloss than the molded articles resulting from the PBT composite materials of Examples 1-5.

Based on the above, the PBT composite material of the present disclosure, in the presence of the predetermined amounts of calcium silicate and coupling agent-modified talc, can significantly increase the heat properties, i.e., the heat distortion temperature reaches up to 186° C. (see Example 4). In addition, the PBT composite material, in the presence of the flowing aid, can effectively increase the surface gloss, i.e., the surface gloss reaches up to 99.2% (see Example 5). In addition, the PBT composite material, in the presence of the predetermined amounts of the PBT resin and the PET resin, can improve the mechanical properties, heat resistance and surface gloss of the vehicle mirror.

TABLE 1

| Components (wt %) | | 1 | 2 | Examples 3 | 4 | 5 | Comparative Examples 1 | 2 |
|---|---|---|---|---|---|---|---|---|
| PBT | | 89.0 | 78.8 | 63.1 | 62.9 | 57.2 | 58.1 | 63.7 |
| PET | | 5 | 10 | 15 | 15 | 20 | 15 | 15 |
| PC | | — | — | — | — | — | 5 | — |
| Inorganic filler | Calcium silicate | 5 | 10 | 20 | 10 | 15 | 20 | 10 |
| | Coupling agent-modified Talc | — | — | — | 10 | 5 | — | — |
| | Glass fibers | — | — | — | — | — | — | 10 |
| Antioxidant | | 0.3 | 0.3 | 0.3 | 0.3 | 0.3 | 0.3 | 0.3 |
| Flowing aid | | 0.5 | 0.5 | 1.0 | 1.0 | 1.5 | 1.0 | 1.0 |
| Nucleating agent | | 0.2 | 0.4 | 0.6 | 0.8 | 1.0 | 0.6 | 0.8 |
| Izod impact strength (kg-cm/cm) | | 6.3 | 5.2 | 3.7 | 3.8 | 3.9 | 3.8 | 3.7 |
| Tensile strength (MPa) | | 57.7 | 57.0 | 59.2 | 52.8 | 54.5 | 58.6 | 53.2 |
| Flexural modulus (MPa) | | 2947 | 3274 | 3687 | 4018 | 3955 | 3609 | 3788 |
| Heat distortion temperature (° C.) | | 149 | 152 | 156 | 186 | 182 | 141 | 175 |
| Surface gloss (%) | | 98.9 | 98.5 | 98.9 | 98.8 | 99.2 | 99.2 | 97.8 |

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. A PBT composite material having high heat resistance for a vehicle mirror characterized in that, based on the total weight of the PBT composite material, the PBT composite material comprises:
   (1) 57.2-88.9 wt % of PBT;
   (2) 5-20 wt % of PET;
   (3) 5-20 wt % of calcium silicate;
   (4) 0-10 wt % of coupling agent-modified talc;
   (5) 0.1-0.3 wt % of an antioxidant;
   (6) 0.5-1.5 wt % of a flowing aid; and
   (7) 0.5-1.0 wt % of a nucleating agent,
   wherein the flowing aid is at least one selected from dimethylsiloxane, a polyester copolymer and a phthalic acid-based polyester, and a surface gloss of the PBT composite material is within a range from 98.5% to 99.2%.

2. The PBT composite material according to claim 1, wherein said PBT has a relative density of 1.30-1.35 g/cm$^3$, a melting point of 220-230° C. and an intrinsic viscosity (IV) of 0.85-1.2 dL/g.

3. The PBT composite material according to claim 1, wherein said PET has a relative density of 1.35-1.40 g/cm$^3$, a melting point of 250-260° C. and an intrinsic viscosity (IV) of 0.65-0.85 dL/g.

4. The PBT composite material according to claim 1, wherein said calcium silicate and said coupling agent-modified talc are mixed at a weight ratio from 1:0.25 to 1:1.5, said calcium silicate has an average particle size of 3-8 μm, and said coupling agent-modified talc has an average particle size of 1-4 μm.

5. The PBT composite material according to claim 1, wherein said coupling agent-modified talc is prepared by mixing 98.5 wt % of talc and 1.5 wt % of a silane or titanate coupling agent at a high speed for 10-60 minutes.

6. The PBT composite material according to claim 1, wherein the antioxidant is at least one selected from pentaerythritol tetrakis(3-(3,5-di-tert-butyl-4-hydroxyphenyl)propionate), tris(2,4-di-tert-butylphenyl)phosphite and octadecyl 3-(3,5-di-tert-butyl-4-hydroxyphenyl)propionate.

7. The PBT composite material according to claim 1, wherein the nucleating agent is at least one selected from a long-chain linear saturated sodium carboxylate, a long-chain linear saturated calcium carboxylate and an aromatic sodium or magnesium carboxylate.

8. A method for preparing the PBT composite material as claimed in claim 1, comprising:
   a step (1) of providing a weight ratio of the PBT, the PET, the antioxidant, the flowing aid and the nucleating agent in predetermined amounts, wherein the flowing aid is at least one selected from dimethylsiloxane, a polyester copolymer and a phthalic acid-based polyester;
   a step (2) of mixing the PBT, the PET, the antioxidant, the flowing aid and the nucleating agent at a predetermined weight ratio and mixing for 10-20 minutes by a high speed mixing machine to obtain a mixture and placing the mixture into a main feed hopper of a twin-screw extruding machine;
   a step (3) of mixing calcium silicate and coupling agent-modified talc at a predetermined weight ratio and mixing for 5-10 minutes by a mixing machine to obtain another mixed material and placing the another mixed material into a side feed hopper of the twin-screw extruding machine; and
   a step (4) of performing melting, extruding and granulating processes by the twin-screw extruding machine to obtain the PBT composite material, wherein the twin-screw extruding machine has a first heating section at a temperature of 210-230° C., a second heating section at a temperature of 230-250° C., a third heating section at a temperature of 230-265° C., a fourth heating section at a temperature of 230-260° C. and a fifth heating section at a temperature of 230-265° C., and has a screw rotation speed of 200-350 rpm,
   wherein a surface gloss of the PBT composite material is within a range from 98.5% to 99.2%.

9. The method according to claim 8, wherein said PBT has a relative density of 1.30-1.35 g/cm$^3$, a melting point of 220-230° C. and an intrinsic viscosity (IV) of 0.85-1.2 dL/g.

10. The method according to claim 8, wherein said PET has a relative density of 1.35-1.40 g/cm$^3$, a melting point of 250-260° C. and an intrinsic viscosity (IV) of 0.65-0.85 dL/g.

11. The method according to claim 8, wherein the predetermined weight ratio of said calcium silicate and said coupling agent-modified talc is from 1:0.25 to 1:1.5, said calcium silicate has an average particle size of 3-8 μm, and said coupling agent-modified talc has an average particle size of 1-4 μm.

12. The method according to claim 8, wherein said coupling agent-modified talc is prepared by mixing 98.5 wt % of talc and 1.5 wt % of a silane or titanate coupling agent at a high speed for 10-60 minutes.

13. The method according to claim 8, wherein the antioxidant is at least one selected from pentaerythritol tetrakis (3-(3,5-di-tert-butyl-4-hydroxyphenyl)propionate), tris(2,4-di-tert-butylphenyl)phosphite and octadecyl 3-(3,5-di-tert-butyl-4-hydroxyphenyl)propionate.

14. The method according to claim 8, wherein the nucleating agent is at least one selected from a long-chain linear saturated sodium carboxylate, a long-chain linear saturated calcium carboxylate and an aromatic sodium or magnesium carboxylate.

* * * * *